United States Patent
Kamerman et al.

Patent Number: 5,909,462
Date of Patent: Jun. 1, 1999

[54] SYSTEM AND METHOD FOR IMPROVED SPREAD SPECTRUM SIGNAL DETECTION

[75] Inventors: Adriaan Kamerman, Nieuwegein; Hans van Driest, Bilthoven, both of Netherlands

[73] Assignee: Lucent Technologies Inc., Murray Hill, N.J.

[21] Appl. No.: 08/775,737

[22] Filed: Dec. 31, 1996

[51] Int. Cl.[6] .................................................. H04B 15/00
[52] U.S. Cl. ............................................. 375/206; 375/200
[58] Field of Search ................................... 370/335, 342, 370/350; 375/200, 206, 207–210; 455/13.4, 69, 506

[56] References Cited

U.S. PATENT DOCUMENTS

| | | | |
|---|---|---|---|
| 5,128,960 | 7/1992 | Van Driest et al. | 375/1 |
| 5,131,006 | 7/1992 | Kamerman et al. | 375/1 |
| 5,267,264 | 11/1993 | Shlenker et al. | 375/231 |
| 5,280,472 | 1/1994 | Gilhousen et al. | 370/18 |
| 5,388,126 | 2/1995 | Rypinski et al. | 375/364 |
| 5,619,525 | 4/1997 | Wiedeman et al. | 375/200 |
| 5,710,768 | 1/1998 | Ziv et al. | 370/342 |

*Primary Examiner*—Stephen Chin
*Assistant Examiner*—Joseph Roundtree, Jr.

[57] ABSTRACT

For use in a direct sequence spread spectrum ("DSSS") receiver adapted to receive a differential phase shift keyed ("DPSK") packet on a channel, the DPSK packet having a training preamble and a data portion, a system to improve detection of the packet under degraded channel conditions, comprising: (1) a detection circuit that derives phase information from symbols in the packet and a weight that is a function of an estimated power profile for the channel and (2) a computation circuit that computes a weighted average for the phase information using the weight, the weighted average being power profile-based to allow the receiver to detect the data contained in the packet more reliably under the degraded channel conditions.

21 Claims, 7 Drawing Sheets

SYSTEM AND METHOD FOR IMPROVED SPREAD SPECTRUM SIGNAL DETECTION

TECHNICAL FIELD OF THE INVENTION

The present invention is directed, in general, to RF transceivers and, more specifically, to RF receivers employing spread spectrum techniques.

BACKGROUND OF THE INVENTION

RF transceivers employing spread spectrum techniques are well-known and widely used. Although the applications in which spread spectrum transceivers are used are too numerous to describe in detail, one increasingly popular application is in the field of wireless computer systems, such as wireless local area networks (LANs).

In a typical wireless computer network environment, the "backbone" of the LAN takes the form of one or more central servers that communicate with a number of network base stations, or access points, through a hard-wired connection. Each access point (AP) includes an RF transmitter/receiver pair (i.e., transceiver) for wirelessly communicating with at least one roaming mobile station ("MS"), which also incorporates an RF transceiver. The mobile station may be a point-of-sale terminal (e.g., an electronic cash register), a bar code reader or other scanning device, or a notepad, desktop or laptop computer.

Each MS establishes a communication link with an AP by scanning the ISM (industrial, scientific, medical) band to find an available AP. Once a reliable link is established, the MS interacts with other mobile stations or a network server, or both. This allows the user of the MS to move freely in the office, factory, hospital or other facility where the wireless LAN is based, without the length of a hard-wired connection to the LAN limiting the MS.

Eventually, however, the MS will move out of range of its current AP, usually into the coverage area of a second AP. When the MS senses that the communication link with the current AP is unacceptably weak (or, more generally, degraded), the MS initiates establishes a new communication link with the second AP.

As noted, wireless LAN products frequently employ some type of spread spectrum technique, such as direct sequence spread spectrum (DSSS) or frequency hopping spread spectrum (FHSS), to communicate between roaming mobile stations and network access points. A distinguishing feature of the spread spectrum technique is that the modulated output signals occupy a much greater transmission bandwidth than the baseband information bandwidth requires.

In DSSS, the spreading is achieved by encoding each data bit in the baseband information using a codeword, or symbol, that has a much higher frequency than the baseband information bit rate. The resultant "spreading" of the signal across a wider frequency bandwidth results in comparatively lower power spectral density, so that other communication systems are less likely to suffer interference from the device that transmits the DSSS signal. It also makes the DSSS signal harder to detect and less susceptible to interference (i.e., harder to jam).

DSSS employs a pseudorandom noise (PN) codeword known to the transmitter and to the receiver to spread the data and to make it more difficult to detect by receivers lacking the codeword. The codeword consists of a sequence of "chips" having values of −1 or +1 (non-return-to-zero (NRZ) or polar signal) or 0 and 1 (non-polar signal) that are multiplied by (or Exclusive-ORed with) the information bits to be transmitted. Accordingly, a logic "0" information bit may be encoded as a non-inverted codeword sequence, and a logic "1" information bit may be encoded as an inverted codeword sequence. Alternatively, a logic "0" information bit may be encoded as a first predetermined codeword sequence and a logic "1" information bit may be encoded as a second predetermined codeword sequence. There are numerous well known codes, including M-sequences, Gold codes and Kasami codes.

Many wireless networks conform to the IEEE 802.11 DSSS standard, which employs the well-known Barker code to encode and spread the data. The Barker codeword consists of eleven chips having the sequence "01001000111" (non-polar) or "+1, −1, +1, +1, −1, +1, +1, +1, −1, −1, −1" (non-return-to-zero (NRZ) or polar signal), in which the leftmost chip is output first in time. One entire Barker codeword sequence is transmitted in the time period occupied by an information-containing symbol. Thus, if the symbol rate is 1 MBaud, the underlying chip rate for the eleven chips in the Barker sequence is 11 MHz.

Numerous techniques may be employed to increase this exemplary data transfer rate above the 1 MBaud symbol rate, including quadrature phase-shift keying (QPSK) modulation, wherein a 2 Mbps data bit stream in the transmitter is grouped in pairs of bits and, depending on the values of the two bits in each pair, two signals are generated. The first signal (called the "in-phase (I) signal" or "I channel") is a first phase-shift modulation signal for a cosinusoidal carrier and the second signal (called the "quadrature (Q) signal" or "Q channel") is a second phase-shift modulation signal for a 90 degree phase-shifted sinusoidal carrier at the same frequency. The combined I and Q channels increase the effective data transfer rate to 2 Mbps. The data transfer rate may be further improved by employing code position modulation, which encodes an additional N bits of data by time-shifting (delaying or advancing) each symbol (Barker sequence) among one of $2^N$ time positions within a fixed reference time frame established by the transmitter. For example, an additional three (3) bits of data can be transmitted per symbol in each of the I channel and Q channel by time-shifting each symbol among one of eight (8) time positions in each fixed reference time frame. This increases the total data transfer rate to 8 Mbps.

By using the 11 MHz chip rate signal to modulate the carrier wave, rather than the original 1 MBaud information signal, the spectrum occupied by the transmitted signal is eleven times greater. Accordingly, the recovered signal in the receiver, after demodulation and correlation, comprises a series of sign-inverted Barker sequences representing, for example, binary logic "1" information bits, and non-inverted Barker sequences representing, for example, binary logic "0" information bits.

As is well known, the IEEE 802.11 standard for wireless LANs using DSSS techniques employs a training preamble to train a receiver to a transmitter. Each transmitted data message comprises an initial training preamble followed by a DATA field. The 192-bit preamble comprises a 128-bit SYNC (synchronization) field, a 16-bit SFD (start of frame delimiter) field, an 8-bit SIGNAL field, an 8-bit SERVICE field, a 16-bit LENGTH field, and a 16-bit CRC field which provides a CRC check for the SERVICE, SIGNAL, and LENGTH fields. The actual number of bits in the DATA field depends on the values stored in the LENGTH field and the SIGNAL field. The DATA field may contain up to 2346 bytes.

The DATA field may be transmitted using DQPSK (differential quadrature phase-shift keying) modulation of both carrier channels (i.e., I channel and Q channel) or DBPSK (differential binary phase shift keying) modulation of only one carrier channel. The preamble, including the 128 symbol SYNC field, is transmitted at a 1 MBaud symbol rate in differential binary phase-shift keying (DBPSK) modulation in which the I channel and the Q channel contain the same information. The receiver detects the synchronization symbols and aligns the receiver's internal clock(s) to the symbols in the SYNC field in order to establish a fixed reference time frame with which to interpret the preamble field (SFD, SERVICE, SIGNAL, LENGTH and CRC) following the SYNC field and the DATA field, which follows the preamble. In the case of a 1 MBaud symbol rate, the fixed reference time frame consists of successive contiguous one microsecond time frames (windows) synchronized to the time frames during which the 11-chip Barker sequences are transmitted.

The preamble, including the SYNC field, is transmitted at the start of every message (data packet). The DATA field within each transmitted message is kept relatively short (up to about 1500 bytes, for example) for a number of reasons. Many wireless protocols, including the IEEE 802.11 DSSS standard, require retransmission of an entire frame (preamble plus DATA field) if an error is detected. Re-transmission of an extremely long frame would be wasteful of bandwidth. Furthermore, it is necessary to share the available bandwidth with other users on the network, but an extremely long frame will effectively slow down the data transfer rates of other users. Finally, channel conditions could change frequently over time by displacement, but, in some modes (such as code position modulation), the channel conditions are only estimated during transmission of the preamble. If an overly long period occurs between preambles, changed channel conditions may lead to increased error rates. For these reasons, it may be necessary to divide a large block of information over many messages in order to complete transmission.

A key performance parameter of any communication system, particularly computer networks and cellular telephone systems, and the like, is the transfer rate of data between devices in the communication system. Wireless LANs are no exception. It is therefore important to maximize the rate at which data may be exchanged between access points and mobile stations in a wireless LAN in order to maximize the LAN performance.

One way to maximize data transfer rates is to minimize the "overhead" associated with each packet of data that is sent from a transmitter to a receiver. Part of the "overhead" of each data packet is the training preamble, including SYNC field, that precedes each DATA field. Minimizing the duration of the training preamble used to synchronize the receiver portion of a spread spectrum transceiver increases the overall throughput of the transceiver.

Furthermore, a receiver has better channel performance when it can be trained well under poor received signal conditions, such as low signal-to-noise ratio (SNR), high multipath fading, and heavy distortion. In other words, the better trained is the receiver, the more accurately the receiver can recover the degraded transmitted data. This yields a lower error rate. Since a high error rate often requires that the entire message be retransmitted, lowering the error rate results in less frequent retransmissions of messages and yields a higher overall data transfer rate.

Prior art receivers have employed matched filtering techniques and RAKE receiver techniques to improve the detection of spread spectrum signals. Matched filtering uses an optimum receiver filter which has a frequency transfer function, $H^*(f)$, matched to the frequency transfer function, $H(f)$, of the channel, where $H^*(f)$ is the complex conjugate of $H(f)$. A RAKE receiver uses an optimum weighting of individual signal contributions. Thus, the RAKE receiver technique is based on the same principle of maximizing the signal-to-noise ratio (SNR) as matched filtering.

Both matched filtering techniques and RAKE techniques require an appropriate training period to accurately acquire the weighting coefficients (taps). During the training period, the detection of the preamble symbol information must be robust before the part of the transmitted signal arrives which contains information. Both techniques use the received signal and a reference signal to determine the matched filtering coefficients or the RAKE weighting coefficients. This determination process may take several tens of symbol intervals to obtain accurate settings if the conditions of the channel are poor.

Accordingly, there is a need in the art for improved RF receivers that can be trained rapidly to the preamble portion of a data packet in order to use a minimum duration preamble. There is a further need for improved RF receivers that can be rapidly and accurately trained to a transmitted signal under poor channel conditions.

SUMMARY OF THE INVENTION

To address the above-discussed deficiencies of the prior art, the present invention provides, for use in a direct sequence spread spectrum ("DSSS") receiver adapted to receive a differential phase shift keyed ("DPSK") packet on a channel, the DPSK packet having a training preamble and a data portion, a system to improve detection of the packet under degraded channel conditions, comprising: (1) a detection circuit that derives phase information from symbols in the packet and a weight that is a function of an estimated power profile for the channel and (2) a computation circuit that computes a weighted average for the phase information using the weight. The weighted average is based on the power profile of the channel to allow the receiver to detect the data contained in the packet more reliably under the degraded channel conditions.

In one embodiment of the present invention, the detection circuit derives the phase information from successive symbols in the packet. Alternatively, the detection circuit may derive the phase information from other patterns of symbols.

In one embodiment of the present invention, the detection circuit derives the phase information from symbols in the training portion. Alternatively or additionally, the detection circuit can derive the phase information from symbols in the data portion of the packet.

In one embodiment of the present invention, the detection circuit derives the phase information by transforming in-phase and quadrature components of the channel into a polar/square representation. In an embodiment to be illustrated and described, the detection circuit employs an I/Q-to-polar/square converter to perform such task, although those skilled in the art will understand that alternative circuits may be employed.

In one embodiment of the present invention, the detection circuit derives the weight by deriving a squared modulus from the impulse response of the channel. The square of the modulus indicates the power profile of the channel.

In one embodiment of the present invention, the packet comprises a plurality of Barker sequence-encoded symbols arranged in chips, the detection circuit sampling each of the chips at least twice (two sample intervals per chip interval)

to derive the phase information and the weight. In the embodiment to be illustrated and described, the Barker sequence consists of 11 chips. The chips are twice-sampled to produce 22 samples per symbol. Those skilled in the art will readily understand, however, that the present invention is not limited by a particular encoding method or sequence length.

In one embodiment of the present invention, the system further comprises a frequency offset compensation circuit, coupled to the computation circuit, that provides a compensation for the frequency offset between the RF carrier frequencies generated in the remote transmitter and in the local receiver. The frequency offset provides a faster convergence and therefore faster acquisition of a degraded channel.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
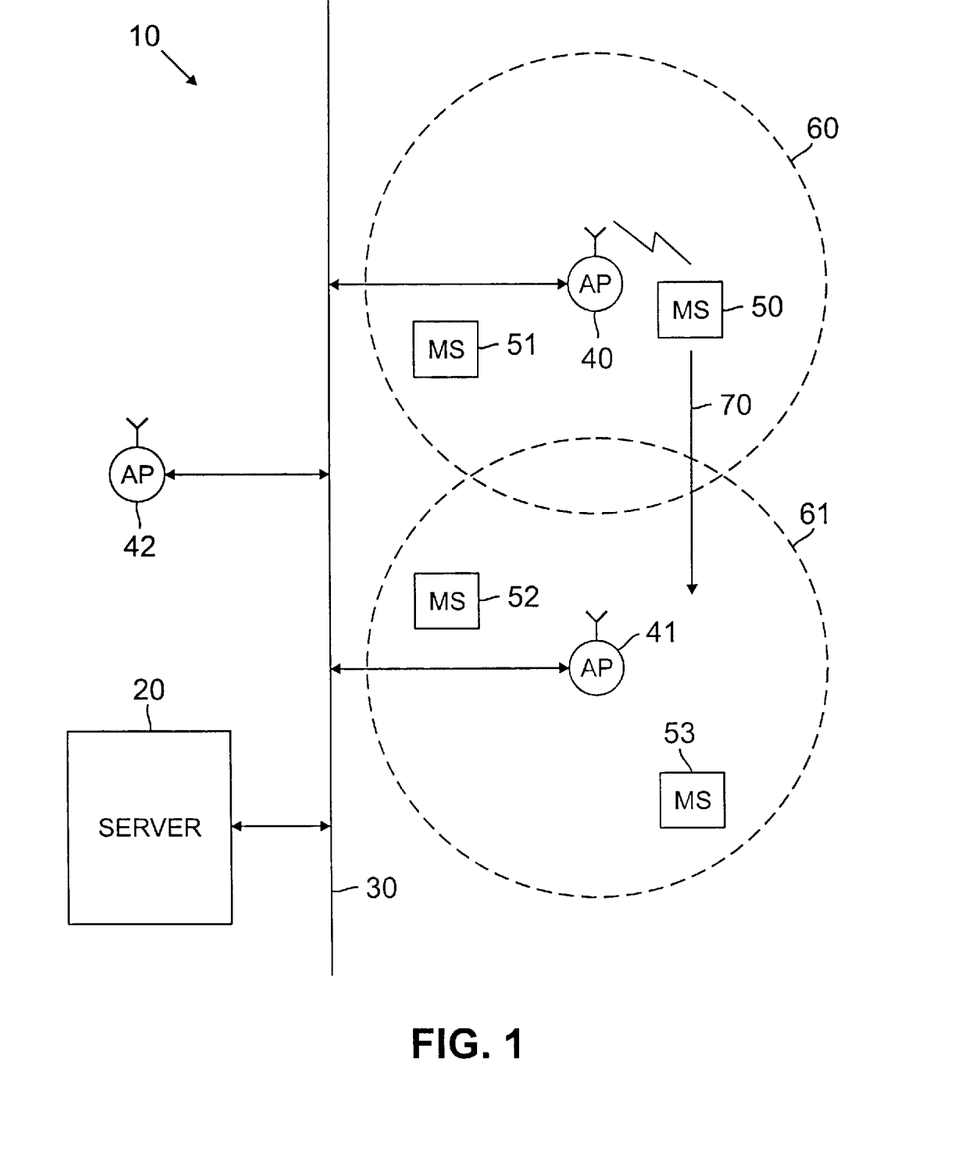
FIG. 1 illustrates a topological diagram of a wireless computer network.

FIG. 1 illustrates a topological diagram of wireless computer network 10. Server 20 of wireless network 10 communicates bi-directionally with access points 40–42 via bus 30, which is typically a hard-wired connection. In other embodiments, server 20 may communicate with one or more of access points (APs) 40–42 by wireless link. APs 40–42 also communicate with one or more mobile stations (MSs) 50–53 by wireless link. Each access point can transmit data to and receive data from mobile stations that are within the specified broadcast range of the access point. For example, AP 40 and AP 41 have broadcast ranges 60 and 61, respectively. AP 40 can communicate with MS 50 and MS 51 and AP 41 can communicate with MS 52 and MS 53.

Although the exemplary broadcast coverage areas of AP 40 and AP 41 are circular in shape, it is possible for the broadcast area of an access point to assume other shapes, including hexagonal, which results from equally splitting the overlapping parts of the circular coverage areas. The shape and size of the coverage area of an access point is frequently limited by penetration loss and by obstructions that prevent the transmission of signals between the access point and a mobile station.

Following the release of the ISM bands, wireless computer networks have been implemented in a wide variety of systems. For example, network 10 may be a wireless LAN in an office building. Mobile stations 50–53 would typically be desktop and/or notebook computers that communicate with a document server, such as server 20, or run payroll or spreadsheet applications in connection with a server. Alternatively, network 10 may be a wireless LAN used to run the operations of a warehouse facility or manufacturing plant. Employees roaming the warehouse or factory floor, or even moving outside the facility, could communicate with a central server using a wide variety of mobile stations. For example, employees could use bar code scanners to send and receive data to/from server 20 through APs 40–42. Still other employees may roam a facility using notepad devices to update inventory in server 20. In still other embodiments, network 10 may a wireless LAN in a large department store and mobile stations 50–53 could be electronic cash registers and/or bar code readers.

As mobile stations 50–53 move about in the wireless LAN environment, the mobile stations will enter and leave the coverage areas of different access points. For example, as MS 50 moves in the direction of path 70, MS 50 moves away from its current access point, AP 40, to a new access point, AP 41. At some point in its movement along path 70, MS 50 determines that the signal quality of the link with current AP 40 has degraded below (or at least close to) an acceptable threshold level. When this occurs, MS 50 begins scanning for another AP in order to set up a "handover".

As noted above, spread spectrum techniques are frequently employed in wireless LANs. Accordingly, in one embodiment of the present invention, the access points, APs 40–42, and mobile stations, MSs 50–53, of network 10 incorporate transceivers (transmitters and receivers) that employ spread spectrum techniques to transfer data. For the purpose of simplifying the description of the improved spread spectrum receiver that follows, it will be assumed that the receivers and transmitters communicate according to the IEEE 802.11 direct sequence spread spectrum (DSSS) standard. However, it should be understood that this assumption is for the purpose of illustration only and is in no way limiting to the scope of the claims of the present invention. In particular, it should be understood that the improved systems and methods hereinafter described for increasing the data transmission rate in a spread spectrum system may readily be employed in wireless computer networks conforming to other standards, and even to communication systems other than computer networks, such as cellular telephone systems and the like.

Figure 2:
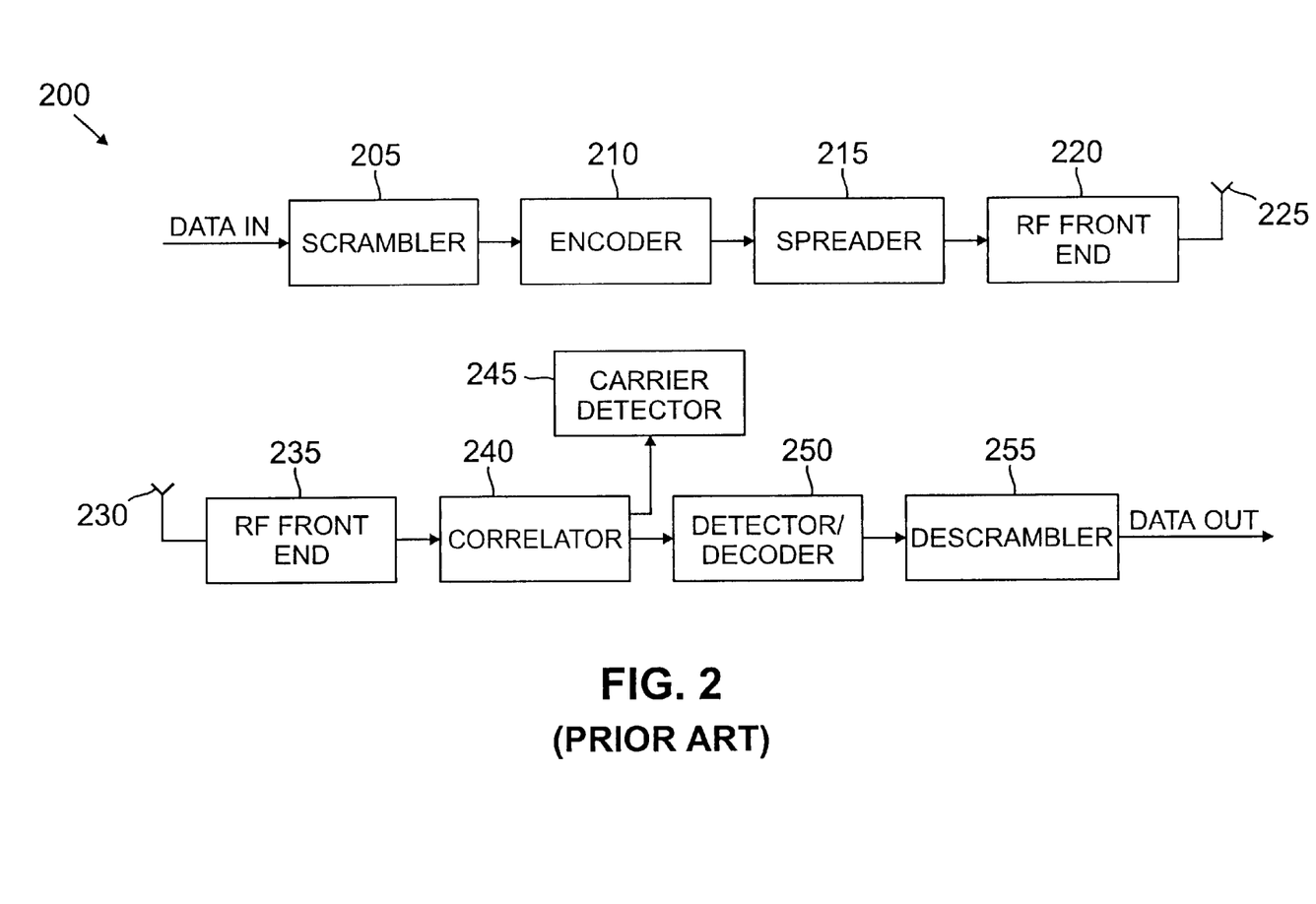
FIG. 2 illustrates a high level block diagram of a transceiver in accordance with the prior art.

FIG. 2 illustrates a high level block diagram of transceiver 200 in accordance with the prior art. In the transmitter portion of transceiver 200, an input signal, DATA IN, is received by scrambler 205, which scrambles the DATA IN signal according to a certain polynomial to avoid repeating patterns. The output of scrambler 205 is the information bit stream that is to be transmitted.

Encoder 210 applies quadrature encoding to the information bits received from the output of scrambler 205. The output streams of encoder 210 are complex-valued signal samples, each consisting of an in-phase component, I, and a quadrature component, Q. If code position modulation is employed during transmission of the DATA field, the I channel signal and the Q channel signal may be time-shifted through one of n time slots in order to transmit an additional N bits of information per symbol. Spreader 210 multiplies each time-shifted bit in each channel by a "symbol" comprising a pseudorandom noise (PN) sequence, also called a chip sequence. As stated, the IEEE 802.11 DSSS standard uses the well-known 11-chip Barker sequence: +1,−1,+1,+1,−1,+1,+1,+1,−1,−1,−1 to encode both the logical I channel signal component and the logical Q channel signal component. For example, a binary logic "1" may be equal to the sign-inverted Barker sequence and a binary logic "0" may be equal to the non-inverted Barker sequence. Multiplying the I channel signal component and the Q channel signal component with the 11-chip Barker sequence increases the frequency at which both the I channel signal component and the Q channel signal component can change by a factor of 11, wherein one composed symbol (i.e., 11-chip sequence) is transmitted in the time frame allocated for a logical signal symbol in the I channel, as well as for a logical signal symbol in the Q channel.

RF front end 220 contains a conventional quadrature modulator that multiplies the in-phase (I) and quadrature (Q) components received from spreader 215 by a cosinusoidal carrier wave and a 90 degree phase-shifted sinusoidal carrier wave, respectively. RF front end 220 also comprises conventional filtering and amplification circuitry used to drive antenna 225. Since the chip rate of the spread signal is 11 times the symbol rate of output signal of encoder 210, the bandwidth occupied by the up-converted spread signal at antenna 225 is 11 times greater than the bandwidth that would be occupied by up-converting the quadrature modulated signal directly from the output of encoder 210.

The transmitted spread signal is received by antenna 230 in the receiver portion of transceiver 200. The process that took place in the transmitter portion is now reversed. RF front end 235 contains conventional amplification and filtering circuitry for conditioning the received signal and eliminating unwanted frequencies. The received signal is mixed in a first mixer with an in-phase signal produced by a local oscillator in order to recover the in-phase component (I channel) of the transmitted signal. The received signal is also mixed in a second mixer with a 90-degree phase shifted signal produced by the local oscillator in order to recover the quadrature component (Q channel) of the transmitted signal.

The outputs of the analog mixers in RF front end 235 are digitized in two separate analog-to-digital converters (ADCs) thereby producing an I channel signal consisting of samples of M bits and a Q channel signal consisting of samples of M bits. The ADC outputs therefore comprise streams of non-inverted and inverted 11-chip Barker sequences that may be at least partially degraded, depending on the amount of multipath fading and noise associated with the transmission channel (i.e., air channel).

For example, if the sampling rate of each ADC is twice the chip rate and each ADC is 4 bits wide, then an ideal (perfectly received) non-inverted Barker sequence (+1, −1, +1, +1, −1, +1, +1, +1, −1, −1, −1 for a NRZ signal) will comprise twenty-two (22) 4-bit ADC samples, each containing a sign bit and three magnitude bits. A +1 chip in the received Barker sequence may, for example, be two consecutive ADC samples having amplitudes of +8, whereas a −1 chip in the received Barker sequence may be two consecutive ADC samples having amplitudes of −7 in the ADC output. A more realistic received signal, however, will comprise 22 ADC samples having values somewhere between +8 and −7, due to distortion from multipath fading, intersymbol interference, noise, and the like.

The outputs of the A/D converters are applied to digital correlator 240, which translates the ADC samples in each channel into waveforms containing a large spike every 22 samples. The spike waveform outputs of correlator 240 are sent to detector/decoder 250. Detector/decoder 250 reverses the encoding process by comparing the amplitudes and phases of the I channel and Q channel spike waveforms to determine the PN chip sequence (e.g., sign-inverted or non-inverted Barker sequence) and the time-shift, if any. The decoded bit stream is then descrambled by descrambler 255, thereby producing the DATA OUT signal, which is the same as the DATA IN signal.

Detector/decoder 250 also outputs a signal to carrier detector 245, which detects that a carrier signal has arrived. For example, if an IEEE 802.11 DSSS preamble is received, carrier detector 245 determines that a signal that has DSSS characteristics and a power level above a certain threshold is present.

Transceiver systems similar to the one described above are disclosed in U.S. Pat. No. 5,128,960 to Van Driest et al. (hereafter, "Van Driest '960 reference") and in U.S. Pat. No. 5,131,006 to Kamerman et al. (hereafter, "Kamerman '006 reference"). Each of the Van Driest '960 reference and the Kamerman '006 reference is commonly assigned with the present invention and each is hereby incorporated by reference for all purposes. Code position modulation schemes for improving data transfer rates are disclosed in U.S. patent application Ser. No. 08/298,260 of Bar-David, filed on Aug. 30, 1994, entitled "A Method and Apparatus for Spread Spectrum Code Pulse Position Modulation" (hereafter, "Bar-David '260 reference") and U.S. patent application Ser. No. 08/345,110 of Bar-David, filed on Nov. 28, 1994, entitled "A Spread Spectrum Code Pulse Position Modulated Receiver having Delay Spread Compensation" (hereafter, "Bar-David '110 reference"). Each of the Bar-David '260 reference and the Bar-David '110 reference is commonly assigned with the present invention and each is hereby incorporated by reference for all purposes.

Figure 3:
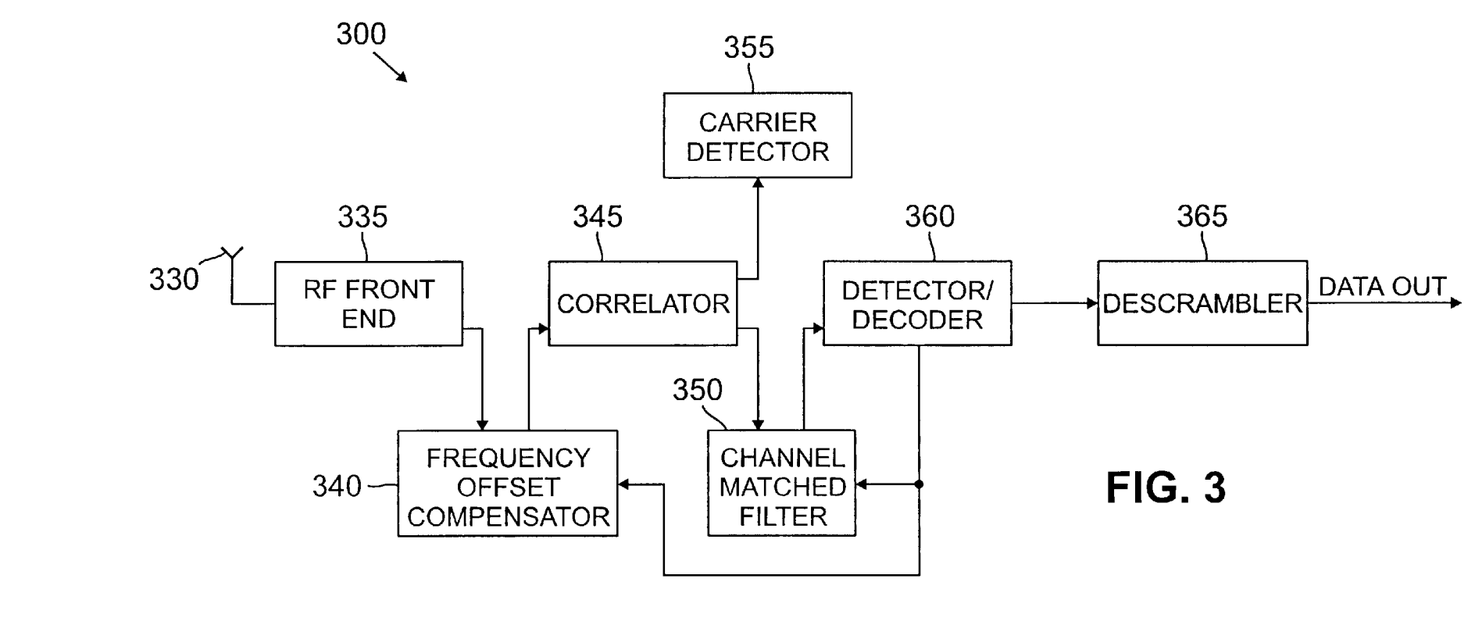
FIG. 3 illustrates a high level block diagram of an improved receiver in accordance with the one embodiment of the present invention.

FIG. 3 illustrates a high level block diagram of improved receiver 300 in accordance with the one embodiment of the present invention. The improved detector/decoder in receiver 300 does not affect, and is not affected by, the operations of either the external transmitter used to communicate with receiver 300 or the associated transmitter portion of the transceiver in which receiver 300 is implemented. Therefore, the transmitter portion will not be discussed.

Receiver 300 includes conventional RF front end 335 similar to that described in the prior art for demodulating a complex carrier frequency into an I channel signal and a Q channel signal. As in the prior art, RF front end 335 produces digitized samples of the I channel and Q channel demodulated signals at its output. In a preferred embodiment, the analog-to-digital converters (ADCs) in RF front end 335 sample the analog I channel and Q channel signals produced by the RF mixers in RF front end 335 at twice the chip rate, so that the digitized I channel and Q channel signals contain 22 samples per symbol.

The I channel and Q channel outputs of RF front end 335 are applied to correlator 345 through frequency offset compensator 340, which shall be further described below. Correlator 345 contains separate internal I channel and Q channel correlators for detecting Barker sequences in each channel. As before, the correlator output functions comprise positive amplitude spike waveforms and negative amplitude spike waveforms, depending on whether the received symbol is an inverted Barker sequence (binary "1") or a non-inverted Barker sequence (binary "0"). The output of correlator 345 is applied to conventional carrier detector 355, which indicates when a DSSS carrier signal of sufficient power is available in the receiver, and channel matched filter 350, which shall be further described below.

The I channel and Q channel correlator output functions, after being conditioned in channel matched filter 350, are applied to improved detector/decoder 360, which shall be further described below. Improved detector/decoder 360 reverses the encoding process by comparing the amplitudes and phases of the I channel and Q channel spike waveforms to determine the PN chip sequence (e.g., non-inverted Barker sequence) and the code position (time shift) of the spikes. The decoded bit stream is then descrambled by descrambler 365, thereby producing the DATA OUT signal, which is the same as the DATA IN signal transmitted by the transmitter (not shown).

The improved receiver of the present invention provides highly reliable detection of symbol information in the SYNC field portion of the preamble after a minimum training period. Certain functions of improved detector/decoder 360 operate only during the preamble portion of each transmitted message in order to rapidly train the receiver to the transmitter and acquire tap settings and frequency offsets, for channel matched filter 350 and frequency offset compensator 340, respectively, which are used improve detection and decoding of symbols transmitted during the DATA field.

Figure 4:
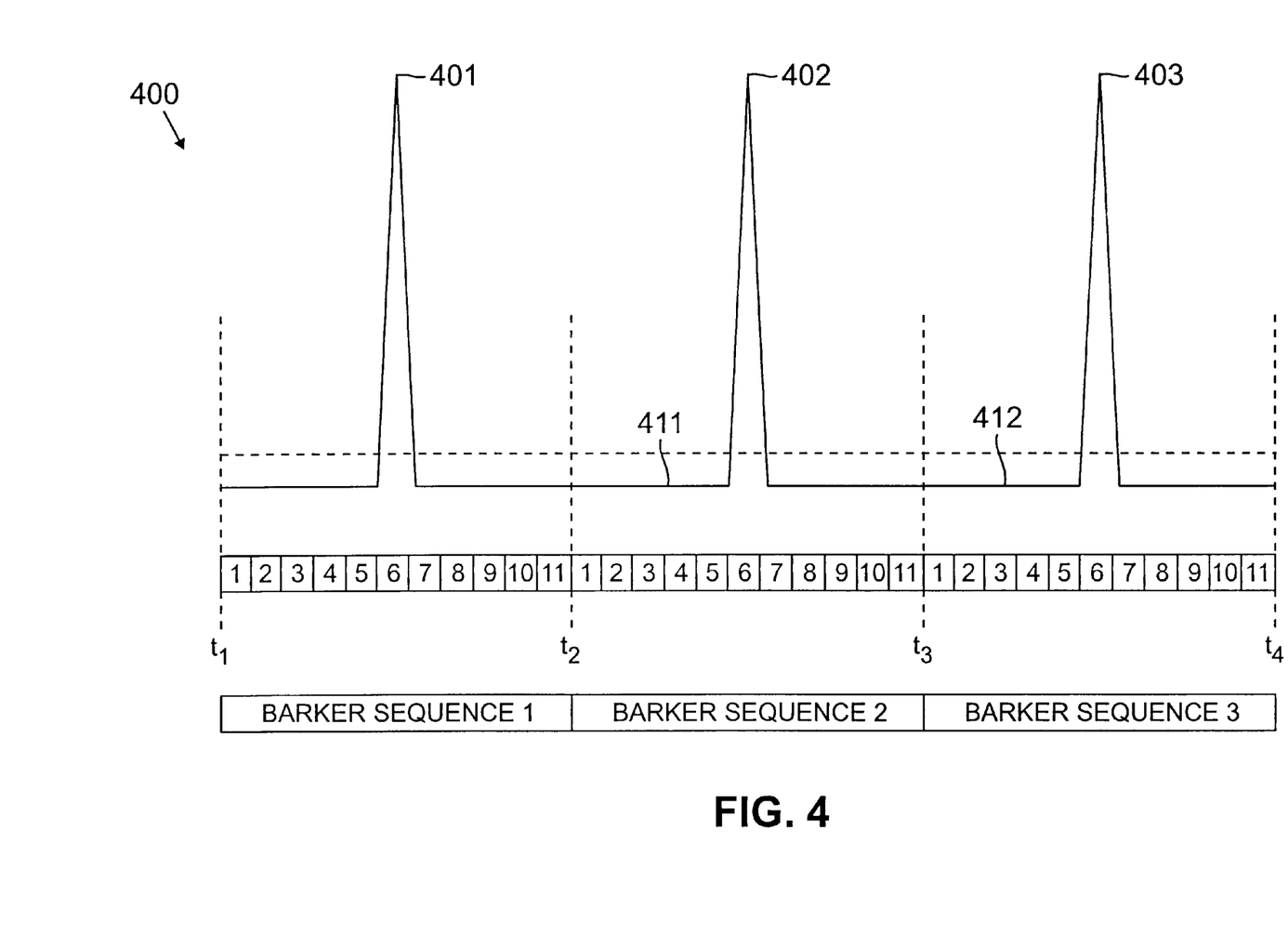
FIG. 4 is an exemplary timing diagram of a first ideal correlator output function.
Figure 5:
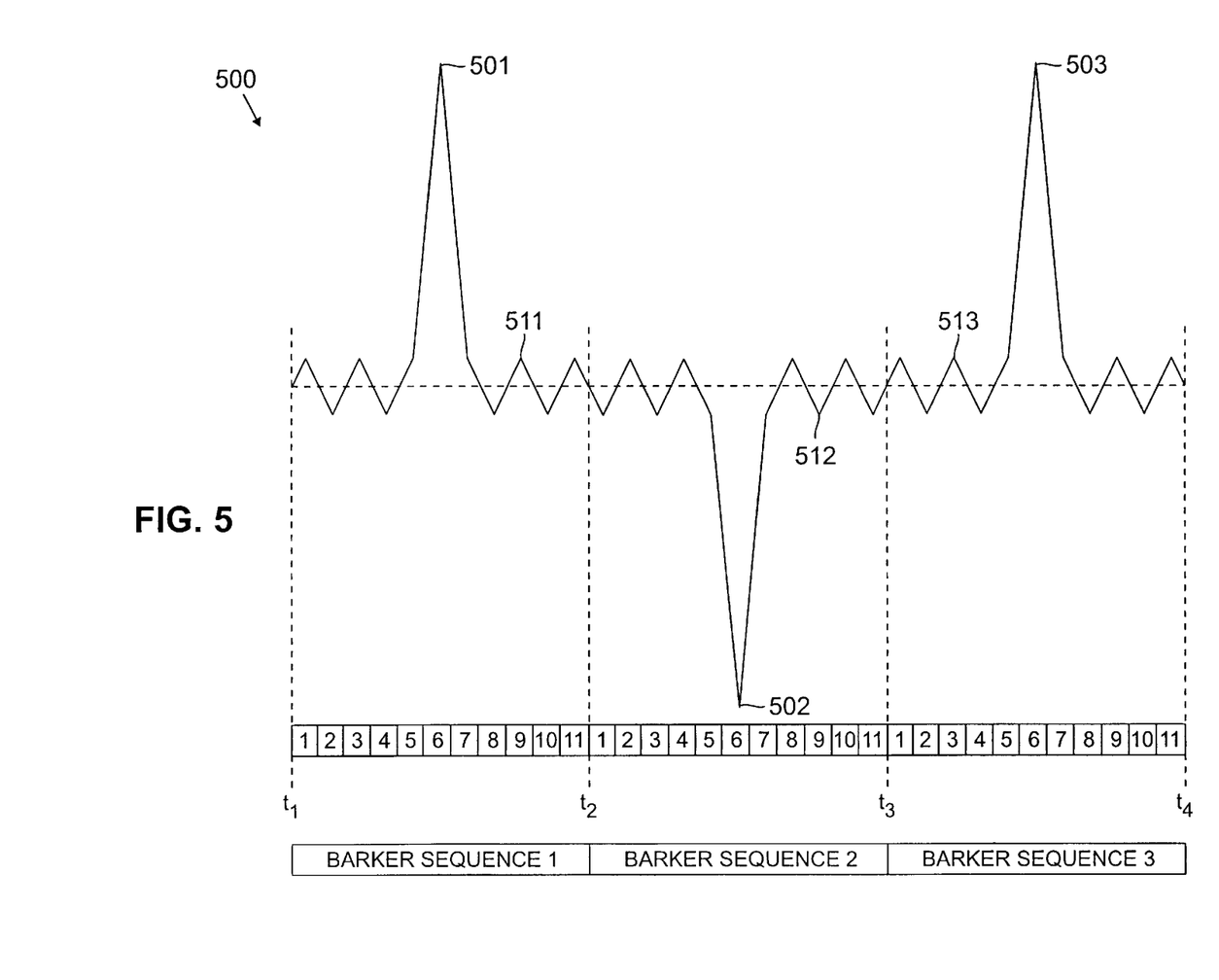
FIG. 5 is an exemplary timing diagram of a second ideal correlator output function.
Figure 6:
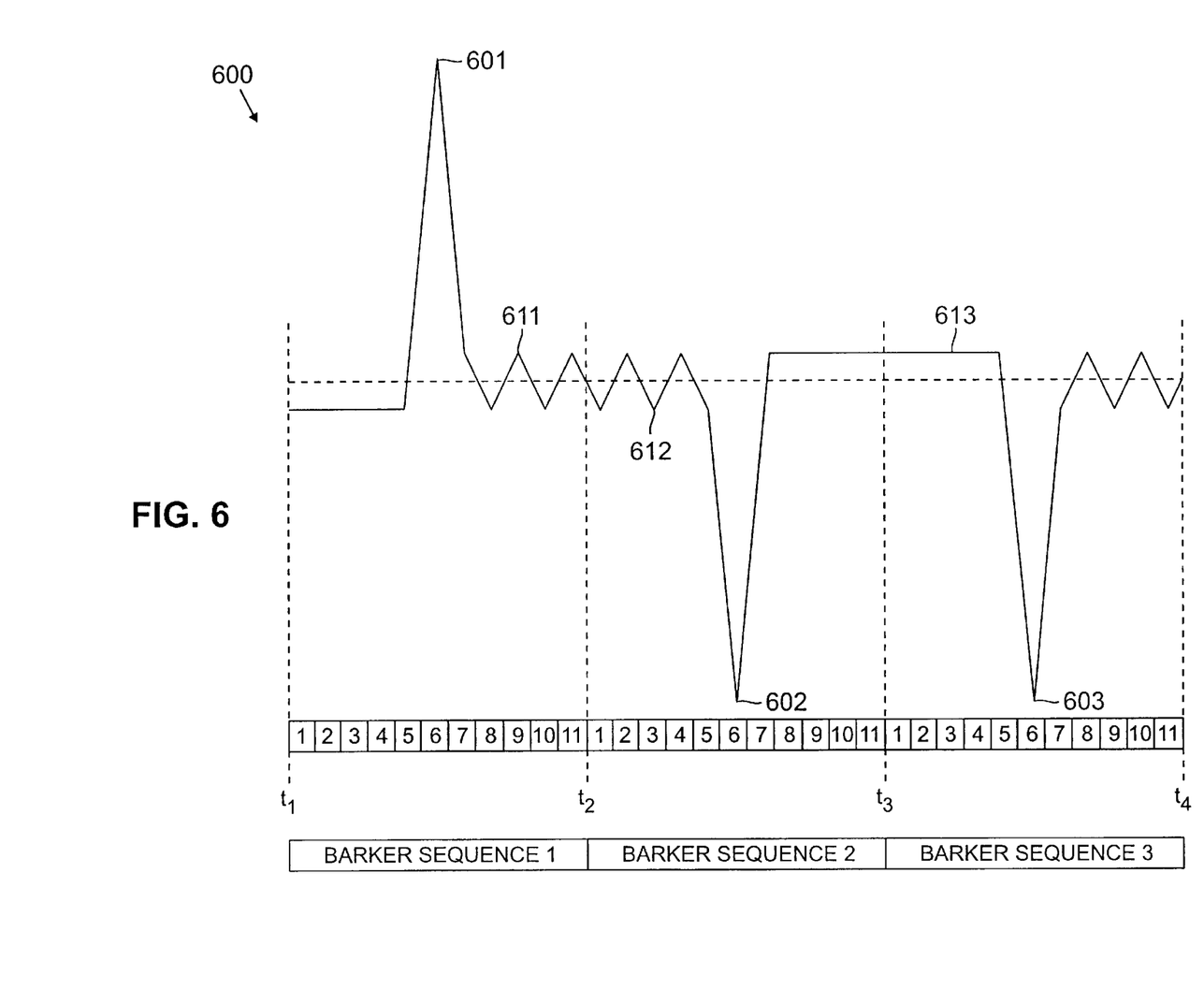
FIG. 6 is an exemplary timing diagram of a third ideal correlator output functions.

FIGS. 4–6 are exemplary timing diagrams of ideal correlator output functions. For the purpose of simplicity in further describing the invention, FIGS. 4–6 depict correlator output functions of only one of the two channels of a quadrature signal. Below each correlator output function a series of eleven time slots is shown. These time slots correspond to chip positions in the received symbols.

Also shown below each correlator output function are Barker sequences 1–3 that show the sequential generation in the transmitter of the symbols that cause the correlator output function. However, it should be understood that no absolute timing relationship is intended to be shown between the Barker sequences in the transmitter and the resulting correlator output function. In fact, the center lobe spikes in the correlator output functions shown in FIGS. 4–6 will not occur until after the end of each Barker sequence, as a result of signal processing delays in each received signal path and due to the fact that an entire chip sequence must be received and fed into correlator 345 before a corresponding center lobe spike occurs.

Code position modulation is not used during the preamble, so the Barker sequences depicted in FIGS. 4–6 are contiguous and do not overlap due to time-shifting. The corresponding waveform spikes are, therefore, evenly spaced (ideally). The correlator output functions therefore represent the result of DBPSK modulation of an I channel carrier by a 1 Mbps bit stream that has been encoded (spread) by 11-chip Barker sequences (symbols).

FIG. 4 is an exemplary timing diagram of a first ideal correlator output function 400. In FIG. 4, the Barker sequences which cause waveform spikes 401–403 all represent the same binary value (e.g., logic "0"), so that the corresponding correlator function has center lobe peaks (spikes) having the same sign (i.e., positive amplitudes). In the ideal waveform depicted, correlator 345 produces fixed-level sidelobes 411 and 412 between waveform spikes.

FIG. 5 is an exemplary timing diagram of a second ideal correlator output function. In FIG. 5, the Barker sequences which cause waveform spikes 501–503 represent alternating binary values (e.g., . . . 0101010 . . . ), so that the corresponding correlator function has center lobe peaks (spikes) that have alternating signs (i.e., alternating positive and negative amplitudes). Furthermore, correlator 345 forms sidelobes 511, 512 and 513 in the spaces between waveform spikes.

FIG. 6 is an exemplary timing diagram of a third ideal correlator output function 600. In FIG. 6, the Barker sequences which cause waveform spikes 601–603 represent random, mixed binary values (e.g., . . . 011 . . . ), so that the corresponding correlator function has center lobe peaks (spikes) that have mixed signs (i.e., mixed positive and negative amplitudes). As in the case of FIGS. 4 and 5, correlator 345 produces sidelobes 611 and 612 and fixed-level sidelobe 613 in the spaces between waveform spikes.

The small sidelobes shown in correlator output functions 400, 500 and 600 are for reference only. The size, shape and spacing of sidelobes 411–412, 511–513 and 611–613 are not intended to be to scale. The sidelobes are shown to demonstrate that correlator 345 generally has some small output value close to zero during symbol processing.

It is again noted that correlator output functions 400, 500 and 600 in FIG. 4–6 are for "ideal" waveforms for perfectly received codewords. In an actual receiver operating in a realistic channel environment, multipath fading, delay spread, noise, intersymbol interference, and the like, will tend to distort the sizes and shapes of both the large center lobe spikes and the smaller sidelobes.

Exemplary correlators similar to correlator 345 that are capable of producing spike waveform outputs similar to the correlator output functions in FIGS. 4–6 are described in greater detail in the Van Driest '960 reference and the Kamerman '006 reference, both of which are incorporated by reference above.

Figure 7:
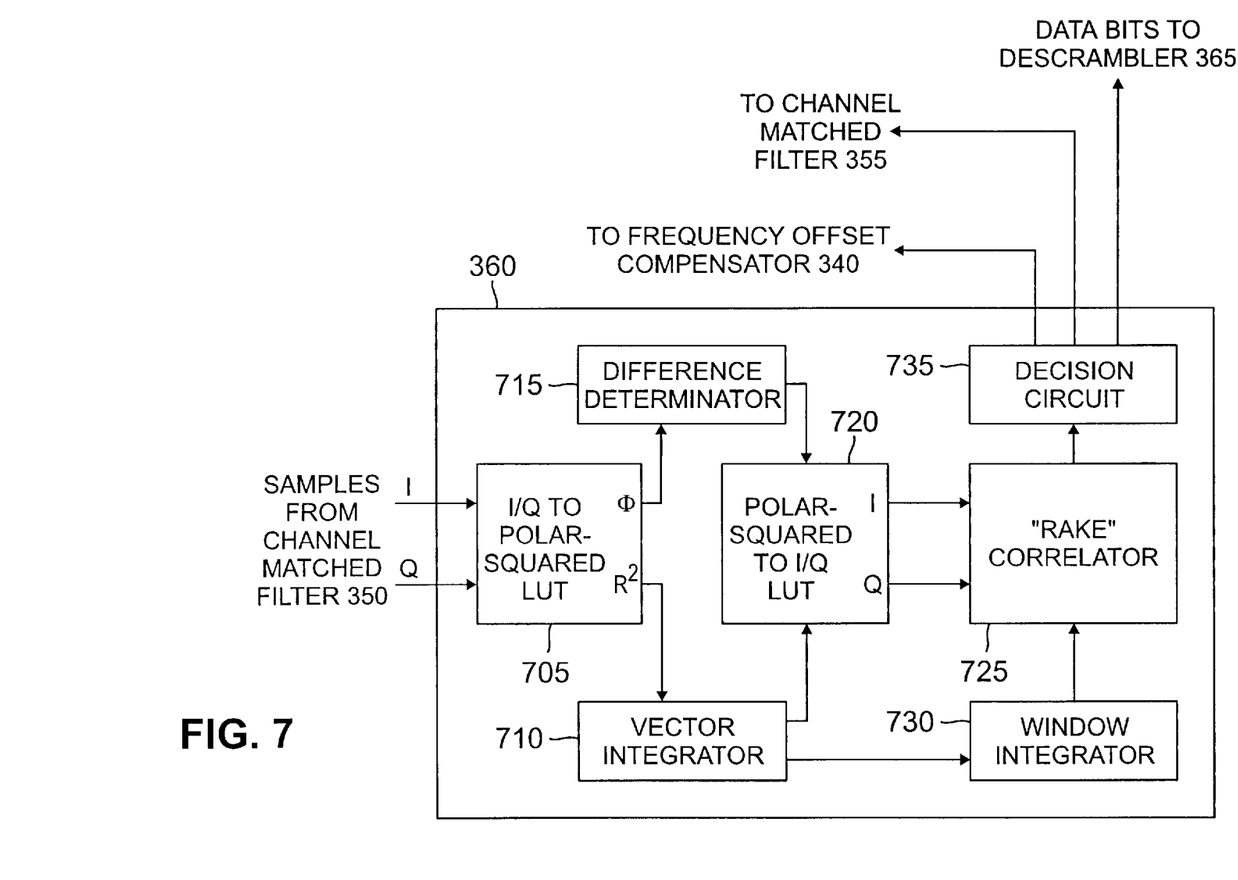
FIG. 7 is a more detailed block diagram of an improved detector/decoder in accordance with the one embodiment of the present invention.

FIG. 7 is a more detailed block diagram of improved detector/decoder 360 in accordance with the one embodiment of the present invention. Detector/decoder 360 receives twenty-two (22) samples per symbol (2 samples/chip) in both the I channel and the Q channel from channel matched filter 350. Detector/decoder 360 may be used during the receiver training period during reception of the SYNC field to acquire the matched filter tap settings. When channel matched filter 350 is inserted as part of the active processing loop between correlator 345 and improved detector 360 and set to the appropriate matched filter tap settings, better symbol detection conditions may be established before the symbols of the SFD (start of frame delimiter) field arrive in the receiver. Detector/decoder 360 may also be used during reception of the DATA field in DBPSK and DQPSK modes.

The front end of detector/decoder 360 comprises I/Q-to-polar-squared look-up table (LUT) 705, which converts the 22 samples of the I and Q input signals into 22 polar-squared samples, each having a squared modulus (amplitude) component, $R^2$, and a phase component, $\Phi$. Vector integrator 710 receives the $R^2$ samples from LUT 705 and stores and integrates each sample in one of twenty-two (22) registers to produce the averaged (integrated) $R^2$ values for each of the 22 samples per symbol. At the start of the training process, vector integrator 710 performs a summation/integration for eight (8) consecutive symbol intervals. After the eight symbol interval, the vector integrator setting is "frozen" at its present value, and a timing recovery process is initiated using window integrator 730.

Window integrator 730 reads the 22 integrated $R^2$ values from vector integrator 710 and determines the positions of the twelve (12) consecutive averaged $R^2$ values that give the largest sum. The mid-point of the positions of the twelve averaged $R^2$ values corresponds to the midpoint of the symbol intervals in correlator functions 400, 500 and 600 at which each of waveform spikes 401–403, 501–503 and 601–603 occurs. The present invention uses the position of twelve averaged samples giving the greatest sum, rather than the position of the single largest averaged sample, because waveform spikes 401–403 in correlator output 400 may be degraded due to channel distortion. Additionally, in a preferred embodiment of the present invention, window integrator 730 uses the largest sum value derived from 12 of the 22 $R^2$ values to calculate a RAKE scaling factor that is used to keep the result of RAKE weighter 725 in range.

Difference determinator 715 receives the phase ($\Phi$) signal samples from LUT 705. Difference determinator 715 compares the present $\Phi$ signal sample with a 22 sample delayed $\Phi$ signal sample to determine a difference, $\Delta\Phi_k = \Phi_k - \Phi_{k-22}$. The $\Delta\Phi_k$ values are applied to polar-squared-to-I/Q look-up table (LUT) 720. LUT 720 also receives inputs from vector integrator 710, namely, the 22 averaged $R^2$ values that were "frozen" after eight symbol intervals at the start of the training period. LUT 720 provides for each sample position, N, a complex-valued sample, $(I,Q)_N = [R_N^2 \cos(\Delta\Phi)_N\ R_N^2 \sin(\Delta\Phi_N)]$, in which $R_N^2$ is the product found by multiplying the frozen $R^2$ vector integrator value for sample position N by the RAKE scaling factor.

RAKE weighter 725 produces the summation of twelve (12) successive $(I,Q)_N$ values once each symbol interval (which corresponds to 22 sample intervals and to 11 chip intervals). The twelve successive $(I,Q)_N$ values are the same ones determined by 15 window integrator 730. The result of the summation forms the input to decision circuit 735, which determines the DBPSK bits in the preamble and possibly the DBPSK or DQPSK bits in the DATA field, and the phase error during detection. The phase error values are sent to frequency offset compensator 340, if necessary, to be used in phase error processing. Frequency offset compensator 340 uses the phase error information to determine the average phase error per symbol interval and thereby provide a frequency offset compensation that adjusts the input of correlator 345.

RAKE weighter 725, by weighting 12 successive $\Delta\Phi_N$ values relative to $R_N^2$, completes a unique weighting routine. The present invention assigns a weighting factor to successive differential phase information samples according to an estimation of the channel power profile for the sample position in question. For an ideal orthogonal code (instead of an 11-chip Barker code), the spike waveform out of the correlator at ideal channel conditions has no sidelobes. In such a case, the estimation of the channel power profile value corresponds to the averaged squared moduli of the signal from the correlator. In the case of an 11-chip Barker code, the presence of sidelobes disturbs the estimation of the channel power profile, even under ideal channel conditions. However, the weighting based on $R_N^2$ results in detection performance close to optimum, because the weighting window is limited to 12 out of 22 sample positions, the Barker code sidelobes are small, and squaring is used, which tends to increase SNR.

The tap weights determined by window integrator 730 are used in RAKE weighter 725 to compensate for phase perturbation in the channel and weight the phase information signal by a factor proportional to signal strength. Thus, a strong signal has a larger tap weight than a weak signal. The operations of different types of RAKE filters and matched filters are disclosed in "Digital Communications", McGraw-Hill, Inc., by J. G. Proakis (hereafter, the "Proakis reference"). The teachings of the Proakis reference regarding matched filters and RAKE receivers are hereby incorporated by reference for all purposes.

The foregoing description of the present invention focuses on an apparatus and method for the rapid detection of symbols in the SYNC field during the preamble and the rapid determination of the channel matched filter tap settings. After the training is completed, however, the transmitting device may optionally switch to pulse code position modulation (PPM) and quadrature phase-shift keying (QPSK) to increase data transfer rate. In such a case, a preferred embodiment of the present invention may switch to a data reception mode, wherein vector integrator 710 may operate as a "leaky" integrator to adapt to changing channel conditions. Leaky integrators are described in the Van Driest '960 reference and the Kamerman '006 reference, both of which were incorporated by reference above.

It will be apparent to those skilled in the art that the improved receiver described above is not limited to systems that conform to the IEEE 802.11 DSSS standard, nor is it limited to systems employing 11-chip Barker sequences. The present invention may be readily adapted for use with other direct sequence spread spectrum standards and with different types of pseudorandom noise codes, such as Kasami codes, Gold codes, etc., that may also be shorter or longer than eleven chips. Furthermore, the delay values, transmission rates, pulse timing positions, symbol durations, interval window sizes, sampling rates, and the like, described above are merely exemplary values and other values may readily be used. For example, longer chip sequences that allow for at least sixteen (16) timing positions in the fixed reference time frame enable four bits, rather than three bits, to be transmitted in each channel by time shifting the transmitted codeword sequences. Lastly, the present invention is not limited to wireless LANs, but is applicable to a wide variety of communication systems, including cellular telephones and the like.

Although the present invention has been described in detail, those skilled in the art should understand that they can make various changes, substitutions and alterations herein without departing from the spirit and scope of the invention in its broadest form.

What is claimed is:

1. For use in a direct sequence spread spectrum (DSSS) receiver adapted to receive a differential phase shift keyed (DPSK) packet on a channel, said DPSK packet having a training preamble and a data portion, a system to improve detection of said packet under degraded channel conditions, comprising:

a detection circuit that derives phase information from symbols in said packet and a weight that is a function of an estimated power profile for said channel; and     a computation circuit that computes a weighted average for said phase information using said weight, said weighted average being power profile-based to allow said receiver to detect said channel more reliably under said degraded channel conditions.

2. The system as recited in claim 1 wherein said detection circuit derives said phase information from successive symbols in said packet.

3. The system as recited in claim 1 wherein said detection circuit derives said phase information from symbols in said training portion.

4. The system as recited in claim 1 wherein said detection circuit derives said phase information by transforming in-phase and quadrature components of said channel into a polar/square representation.

5. The system as recited in claim 1 wherein said detection circuit derives said weight by deriving a squared modulus from said channel.

6. The system as recited in claim 1 wherein said packet comprises a plurality of Barker sequence-encoded symbols arranged in chips, said detection circuit sampling each of said chips at least twice to derive said phase information and said weight.

7. The system as recited in claim 1 further comprising a frequency offset compensation circuit, coupled to said computation circuit, that provides an offset to a frequency of said channel that is a function of said phase information and said weight.

8. For use in a direct sequence spread spectrum (DSSS) receiver adapted to receive a differential phase shift keyed (DPSK) packet on a channel, said DPSK packet having a training preamble and a data portion, a method of improving detection of said packet under degraded channel conditions, comprising the steps of:

deriving phase information from symbols in said packet and a weight that is a function of an estimated power profile for said channel; and computing a weighted average for said phase information using said weight, said weighted average being power profile-based to allow said receiver to detect said phase information from said channel more reliably under said degraded channel conditions.

9. The method as recited in claim 8 wherein said step of deriving comprises the step of deriving said phase information from successive symbols in said packet.

10. The method as recited in claim 8 wherein said step of deriving comprises the step of deriving said phase information from symbols in said training portion.

11. The method as recited in claim 8 wherein said step of deriving comprises the step of transforming in-phase and quadrature components of said channel into a polar/square representation.

12. The method as recited in claim 8 wherein said step of deriving comprises the step of deriving said weight by deriving a squared modulus from said channel.

13. The method as recited in claim 8 wherein said packet comprises a plurality of Barker sequence-encoded symbols arranged in chips, said step of deriving comprising the step of sampling each of said chips at least twice to derive said phase information and said weight.

14. The method as recited in claim 8 further comprising the step of providing an offset to a frequency of said channel that is derived using said weighted average.

15. A mobile station, comprising:

a direct sequence spread spectrum (DSSS) receiver adapted to receive a differential phase shift keyed (DPSK) packet on a channel, said DPSK packet having a training preamble and a data portion, said receiver having:

a radio frequency (RF) demodulator tunable to a frequency of a carrier of said channel, a correlator, coupled to said RF demodulator, that detects symbols in said packet, a carrier detector, coupled to said correlator, that detects a presence of said carrier, a detection circuit, coupled to said correlator, that, when said carrier detector detects said presence, derives phase information from symbols in said packet and a weight that is a function of an estimated power profile for said channel, and a computation circuit that computes a weighted average for said phase information using said weight, said weighted average being power profile-based to allow said receiver to detect said phase information from said channel more reliably under degraded channel conditions, and a descrambler, coupled to said detection circuit, that produces a stream of digital data from said symbols in said packet.

16. The mobile station as recited in claim 15 wherein said detection circuit derives said phase information from successive symbols in said packet.

17. The mobile station as recited in claim 15 wherein said detection circuit derives said phase information from symbols in said training portion.

18. The mobile station as recited in claim 15 wherein said correlator separates said channel into in-phase and quadrature components and said detection circuit derives said phase information by transforming said in-phase and quadrature components into a polar/square representation.

19. The mobile station as recited in claim 15 wherein said detection circuit derives said weight by deriving a squared modulus from said channel.

20. The mobile station as recited in claim 15 wherein said packet comprises a plurality of Barker sequence-encoded symbols arranged in chips, said detection circuit sampling each of said chips at least twice to derive said phase information and said weight.

21. The mobile station as recited in claim 15 further comprising a frequency offset compensation circuit, coupled between said RF demodulator and said correlator, that provides an offset to a frequency of said channel that is derived from said phase information and said weight.

* * * * *